Figure 1:
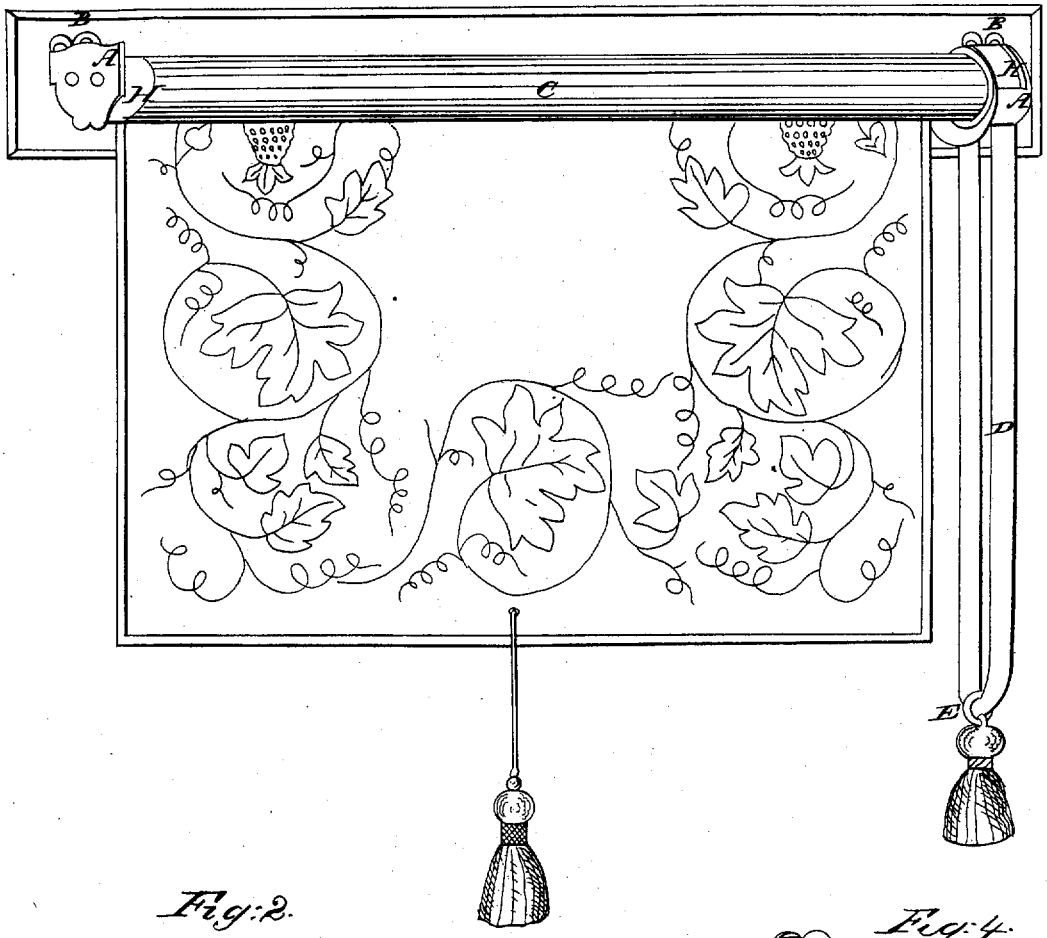
Figure 2:
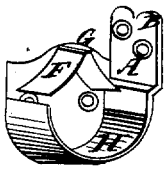
Figure 3:
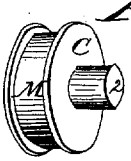
Figure 4:
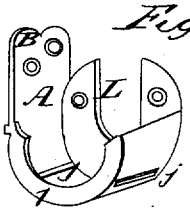

J. B. BAILEY.

Curtain Roller.

No. 543.

Reissued Apr. 13, 1858.

Witnesses.

H. H. Baily

W. B. Andrus

Inventor

J. B. Bailey

N. PETERS, PHOTO-LITHOGRAPHER, WASHINGTON, D. C.

UNITED STATES PATENT OFFICE.

JACOB B. BAILEY, OF NEW YORK, N. Y.

IMPROVEMENT IN ROLLERS FOR WINDOW-SHADES.

Specification forming part of Letters Patent No. 19,336, dated February 16, 1858; Reissue No. 513, dated April 13, 1858.

*To all whom it may concern:*

Be it known that I, JACOB B. BAILEY, of the city of New York, in the county and State of New York, have invented a new and useful Improvement in Window-Shade Rollers; and I do hereby declare that the following is a full and exact description thereof, reference being had to the accompanying drawings and the letters of reference marked thereon.

Figure I is a perspective view of my improvement, the shade being partly up. Fig. II is a perspective view of the left-hand bracket, showing the arrangement of a spring, F. Fig. III is a perspective view of the pulley, showing an india-rubber band round it. Fig. IV is a perspective view of the right-hand bracket, showing a flange, *i*, and slot *j j*.

Similar letters of reference in each of the four figures indicate corresponding parts.

In the use of window-shade rollers for raising and lowering the shades by winding and unwinding them, the use of a lower bracket attached to the window-casing for straining the cord to give it sufficient friction upon the roller or roller-pulley to turn it is inconvenient, and the constant strain on the cord caused thereby causes it to separate and soon wear out. It is therefore important to obviate the necessity and consequently the means of so straining it; and various devices have been devised for the purpose of avoiding the necessity of straining the cord between two points, and at the same time secure sufficient friction between the cord or band and the pulley on the roller or the end of the roller or part in connection with which the cord or band acts to rotate the roller, to cause the roller to be turned by pulling the cord, and more or less success has been attained; but the means which I have invented for that purpose, and which I am about to describe, and for which I ask a patent, I believe to be better, more simple, and less liable to get out of order than any other ever known for that object.

The nature of my invention consists in the combination of india-rubber or its equivalent substance with window-shade rollers over which the endless cord or band for turning the roller is to pass, by which (and a light pressure from a spring or its equivalent to prevent the latter from too easily turning) I secure sufficient friction upon the cord to secure the operation of the roller and admit of dispensing with the lower bracket for strain upon the cord, and thereby allow it to hang loosely, or with only a tassel suspended to it to keep it straight and for ornament.

To enable others skilled in the art to make and use my invention in what I believe to be the best form of it, I will proceed to describe its construction and operation.

A A, Fig. I, are the brackets; B B, screw-holes for the purpose of attaching the brackets to the window-frame. D is the band by which the shade is moved up or down, the said band passing through the ring E freely allows the tassel to remain as shown in the drawings at E, Fig. I.

Fig. II is a perspective view of the left hand bracket, showing the arrangement of the spring F, the said bracket being cast with a projection, and the same being sawed to receive the spring F, the roller C, Fig. 1, having its bearing at H, the spring F, pressing on the said roller, causing it to remain in any position desired, and preventing the end of the roller from being thrown up. The right-hand bracket, Fig. IV, is cast with a flange, *i*, and having two slots in the lower part, *j j*, for the band to pass through and over the pulley, as shown at *k*, Fig. I. The flange *i*, Fig. IV, prevents the roller from shifting to the right or left, and thereby injuring the edge of the shade. L is the bearing to receive the journal 2 of the roller or pulley C, Fig. III. This pulley has an india-rubber band drawn tightly round it at M, and the hoisting-band passing over the roller secures the contact and friction between the band and rubber surface attached to the roller, or the same end and action can be attained, but in an inferior manner, by inlaying the face of the pulley with pieces of rubber, or by having a circular piece of rubber attached to the roller in any other way for the band to travel over to produce the rotation of the roller, the object being to so construct the rubber part in combination with the roller as to adapt it to receive and be acted upon by the hoisting-band or weighted to secure sufficient friction to rotate the roller without being shoved. The band D cannot be thrown off, as the width of the slots *j j*, Fig. IV, will not allow it. The flange *i*, formed on the bracket, Fig. IV, prevents any shuffling of the roller, thereby injuring the edge of the shade. The india-rubber band on the pulley, Fig. III, effectually prevents the band from shifting under any circumstances, and, having nothing to impede the movement of the band, it runs freely, and cannot be thrown from the pulley.

Thus it will be seen that this device for window-shades is easily kept in order, and is effectual in its operation.

I do not claim spring F for the purpose of holding the roller, nor do I claim the endless band, nor do I claim the use of the india-rubber as new for the purpose of creating friction on a pulley, as that has been before known and used; but What I do claim as my invention, and desire to secure by Letters Patent, is—

The combination of india-rubber or equivalent substance with a window-shade roller or its pulley, substantially as and for the purpose described.

J. B. BAILEY.

In presence of—
H. H. BAILEY,
M. B. ANDRUS.